United States Patent Office 3,824,323
Patented July 16, 1974

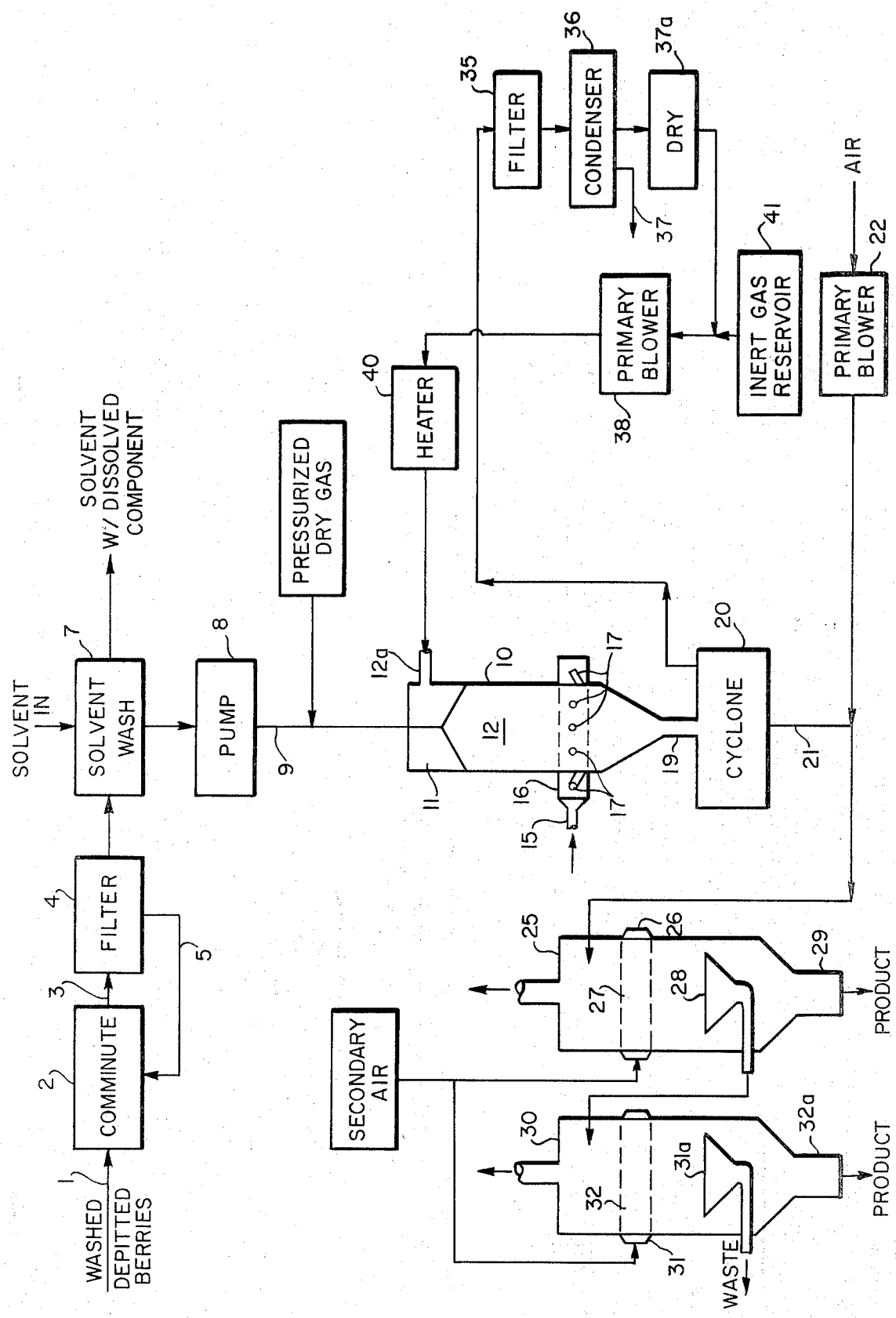

3,824,323
METHOD OF PREPARING TASTE-MODIFYING COMPOSITION
Robert Joseph Harvey and John Richard Fennell, Sudbury, Mass., assignors to Mirlin Corporation, Hudson, Mass.
Continuation-in-part of application Ser. No. 28,981, Apr. 15, 1970, now Patent No. 3,676,149, dated July 11, 1972, and a continuation-in-part of abandoned application Ser. No. 130,481, Apr. 1, 1971. This application July 10, 1972, Ser. No. 269,972
Int. Cl. A23l 1/26
U.S. Cl. 426—429                      25 Claims

ABSTRACT OF THE DISCLOSURE

A process for obtaining a dry powdered concentrate containing the taste modifying principle from *Synsepalum dulcificum* Daniell, in a stable form which is useful in conjunction with foods such as confections, desserts, jellies, jams, canned fruit, beverages, and coatings to render sour-tasting foods sweet tasting, and to improve the flavor of certain foods while maintaining this taste modifying characteristic for long periods under normal atmospheric conditions. The concentrate is obtained by comminuting the ripe fruit of *Synsepalum dulcificum* Daniell, spray drying the comminuted slurry to reduce the moisture content between 0.5 to about 5% by weight, and separating the spray dried powder obtained on a density basis to recover a high density fraction. Carbohydrates, fats and pigments can be removed from the stable taste-modifying principle by solvent extraction to obtain concentrated compositions of the stable taste-modifying principle which are employed to form unit dosage forms thereof.

---

This application is a continuation-in-part of our application Ser. No. 28,981, filed Apr. 5, 1970, now U.S. Pat. No. 3,676,149, issued July 11, 1972, entitled "Taste Modifying Composition and Method of Preparation" and our application Ser. No. 130,481, filed Apr. 1, 1971, entitled "Unit Dosage With Variable Temporal Characteristics for Modifying Sour Taste," now abandoned.

This invention relates to a stable taste-modifying composition and to its method of preparation.

*Synsepalum dulcificum* Daniell, Sapotaceae is a plant indigeneous to west-central Africa which bears a red ellipsoid fruit commonly known as "miracle fruit." The fruit has a palatable pulp and skin and contains a large seed. It is characterized by a pleasant taste and by the unique property, well-recognized for over 200 years, of modifying the sweet and sour tastes in the unusual manner. It has been found that the proteineous component in the fruit binds at sites on the tongue and in the oral cavity and, once bound at these sites, alters the way in which the taste receptors respond to certain foodstuffs eaten subsequently. This is particularly true of sour or acidic foods such as fruit. Any normally sour food eaten within a short period after first contacting the tongue with the pulp of fresh miracle fruit, causes the normally sour food to taste pleasantsly sweet. By exposing the taste receptors on the tongue to mirable fruit, any sour tasting food can be made to taste sweet without the addition of sugar or artificial sweeteners. For example, fresh lemon can be made to taste pleasantly sweet by first eating a miracle fruit berry. It not only sweetens the lemon but also improves its flavor. Therefore, the fruit of *Synsepalum dulcificum* is a taste modifier which both sweetens and improves the flavor of normally sour tasting foods. It also selectively enhances the flavor of a few foods not normally regarded as tasting sour, such as mushrooms, cantalope melons, and several vegetables.

Two investigators have identified a specific form of the active principle in "miracle fruit" as a glycoprotein having a molecular weight of about 44,000. Several approaches have been explored in attempts to isolate the active component in the miracle fruit for subsequent use as a taste-modifying material. These attempts have met with only very limited success either because of the form of the product obtained by these methods is less effective than the natural fruit, or it was found to be unstable at normal room temperatures under normal atmospheric conditions. This instability necessitated either very quick use after isolation or storage at very low temperatures, either or both of which seriously limits the utility of this material.

The prior art has regarded the active taste-modifying principle as a very labile material, accounting for the observed instability of concentrates maintained at normal room temperature. While some degree of success has been attained in improving stability of the active principle in the order of about a week or so, it has been found that its stability could not be maintained in a powder form at normal room ambient conditions. Alternatively, the material was dissolved in specific solvents maintained at a specific pH. These solutions had to be refrigerated to be preserved, and even then this material was not stable for more than two weeks. Also material isolated in the past has not been effective as the natural fruit, particularly in its ability to improve the flavor of certain foods.

The active principle is present in the pulp and on the inner surface of the skin of the miracle fruit berry, and in its natural environment it is quickly deactivated especially when exposed to air once the skin is broken at room temperatures. Furthermore, after the fruit has been picked, even prior to breaking the skin, the active material begins to degrade but at a slower rate than when the skin is broken. While the process by which degradation proceeds is not known exactly, it is now believed that certain enzymes present in the fruit accelerate degradation in the presence of air and moisture at normal room temperatures. It has been found that when the pulp of miracle fruit is frozen and subsequently lyophilized to form a granular or powder material, the product had to be either stored in a desiccator or refrozen in order to maintain the activity of the material that remained.

The prior art processes for isolating the active principle based upon extraction techniques not only resulted in products which are not stable at room ambient conditions, but also products that do not exhibit the full flavor enhancing characteristics. Photomicrographs of stained sections of the fruit pulp of the berry, show that the active principle is an integral part of the cellular membranes that permeate throughout the fruit pulp. The glycoprotein is particularly concentrated in the membranes just beneath the skin of the berry and in the membranes surrounding the large single central seed. In order to extract the glycoprotein in a pure form, the prior art used various means for breaking the bonds holding the glycoprotein at sites in these membranes. It is believed that the conditions employed in the extraction processes modify the active principle so as to remove certain prosthetic groups or sugar moieties from the basic molecule, thus accounting for some of the loss of flavor-enhancing characteristics in the product obtained. In addition, it is believed that the removal of these groups from the molecule, alters the molecule in such a way as to effect the physical characteristics of the active substance. For instance, the material known as miraculin, prepared by the methods described by Kurihara & Beidler, "Science," Volume 1, pages 1241–1243, 1968, both tend to agglomerate, even when prepared as a dry powder. This relatively pure glycoprotein with a molecular weight of approximately 44,000, is not stable at room temperature and normal ambient conditions for more than a week or two. Although the exact mechanisms are not completely understood, it is believed that the bonds originally binding the molecule to the cellular membranes, as well as the sites originally occupied by sugar moieties, are involved in this alteration in the physical properties of the material. Possibly degradation or denaturation is by autolysis which degrades the taste-modifying principle and causes it to lose its ability to modify the sweet and sour tastes and its ability to enhance flavors.

In applicants' prior above-identified application Ser. No. 28,981, there is described a composition containing the active principle which is stable at room ambient conditions for two years or more in that it retains the characteristics of modifying the sweet and sour taste receptors of the tongue and enhancing the flavor of foods. The process described in the prior application for obtaining the concentrate involved comminuting the miracle fruit pulp and skin at low temperature, separating the vaporous and liquid components from the solid components at low temperature such as by freeze-drying, to form a solid residue; and finally separating the concentrate on the basis of density from the solid residue. It was believed that a significant loss of activity would occur if the comminution and separation of liquid and vaporous components were not conducted at low temperatures. Accordingly, in the preferred process, frozen carbon dioxide or water was added to the frunit during comminution, and freeze-drying was employed to separate the liquid and vaporous components. In addition, it was believed desirable to remove as much of the water as possible from the solid material rich in the active principle to minimize or eliminate degradation of the active principle.

Applicants now have discovered that it is not necessary to comminute the miracle fruit pulp and skin at such low temperatures prior to drying since the time necessary to complete comminution is short and the loss of the active principle is not significant. In addition, applicants now have discovered that the temperature of about $-40°$ C. or below need not be employed during dehydration to prevent degradation of the active principle since the comminuted miracle fruit can be dehydrated quickly at slightly elevated temperatures without significant loss of the active principle.

The material rich in the active principle obtained by the process of this invention is a powdered or granulated composition which is stable in a powdered form at normal atmospheric conditions over extended periods of time of a year or more and having the characteristics of suppressing sour taste while accentuating sweet and salt taste, and enhancing the flavor of foods ingested subsequently. The product is a stable, cream-colored powder comprising the active principle admixed with material inert with respect to the characteristic of suppressing sour taste, but excluding components that degrade the active principle present in the pulp and skin of miracle fruit including the active enzymes that normally would degrade the active principle. Since the product of this invention is extremely stable, it can be used in many applications for which the unstable prior art products are not suitable. Thus, the product of this invention can be coated on or admixed with many foods to modify their taste without the necessity of special packaging or quick use. The unstable prior art products are not useful in most of these applications due to their instability believed to be caused by the hygroscopic nature of the carbohydrate components in the fruit which causes the absorbed moisture to actuate the enzymes retained in the pulp even after dehydration.

In accordance with the process of this invention, a stable composition containing the active principle in concentrated form is obtained by comminuting depitted ripe miracle fruit containing the active principle and then separating the vaporous and liquid components. The active enzymatic components of the ripe fruit that normally degrade the active principle, are either separated from, or deactivated, in the final concentrate. The liquid and vaporous components are separated by spray-drying and the enzymatic components are separated by means that effects separation on the basis of density. The processes described therein are based upon the approach of removing from the fruit, or otherwise deactivating, those constituents in the fruit which are responsible for its instability or other undesirable characteristics rather than trying to remove the active principle from its natural site in the fruit, as have all the previous investigations. In this maner, it is believed that the active principle remains bound to the cellular fragments thus retaining its molecular structure as is the case in the natural fruit, but in the absence of active enzymes present in the natural fruit.

To minimize loss of the active principle after picking, the whole fruit can be frozen to very low temperatures to await processing of the fruit pulp and skin can be proccessed immediately or within about 10 hours after picking to obtain the active principle concentrate. Commnunition of the fruit serves to fracture the cell walls and thereby expose substantially all of the active principle and facilitate subsequent processing. Comminution is effected to obtain particles having an average size of about 50 to 300 microns. The comminuted particles then are dried by spray-drying to dry the particles. The particle temperature during spray-drying is controlled by controlling particle residence time in the drying gas, and temperature of the drying gas. When employing a drying gas containing a relatively large concentration of free oxygen, particle temperature is maintained below about 80° C., preferably between about 50 and 70° C. since it has been found that at elevated temperatures the free oxygen oxidizes a portion of the active principle thereby reducing its effectiveness for modifying the taste receptors of the tongue. In contrast, when the drying gas contains little free oxygen, i.e. less than about 10 vol. percent, or no free oxygen., slightly higher particle temperatures can be effected since the active principle will not become oxidized but not such high particle temperatures as to thermally denature the proteinaceous active principle. For example, when employing a gas such as carbon dioxide or nitrogen containing little or no free oxygen, particle temperatures in the order of about 165° C. can be employed for residence times normally encountered in spray-drying apparatus, i.e. in the order of a few seconds or less. When employing air, economic advantages are obtained because of the ready gas supply and it is believed that at the particle temperatures set forth above for air, that at least a portion of the enzymes that degrade the active principle become deactivated, possibly by oxidation. If the spray-dried active principle is not separated from the material containing the active enzyme, the product remains unstable and will be degraded quickly at normal room condition so that it loses its taste-modifying effects. The material rich in the active principle has a substantially higher density than the material containing the enzyme. Therefore, the separation of the active principle, that may contain some cellulosic material, from material containing the enzyme is effected by processes that separate materials on a density basis.

The invention will be more fully described with reference to the accompanying figure.

Referring to the figure, washed depitted ripe miracle fruit berries are directed through conduit 1 to comminuter 2 wherein the skin and fruit pulp are blended to an average particle size less of about 50 to 300 microns. The comminuted berries then are directed through conduit 3 to filter 4 wherein the particles having an average size less than 150 microns are spearated from larger size particles. The larger size particles are recycled to the comminuter through conduit 5 while the small size particles in slurry form pass into hopper 7. The particles are then washed several times in a solvent which dissolves carbohydrates such as a mixture of ethanol (75%) and water (25%)

which solvent can also remove various pigments, some fat, and other more soluble components. Removal of these components increases the concentration of the active principle. The essentially colorless, tasteless concentrate which is very nearly non-hygroscopic, does not result in rancidity due to oxidation of the fat components. The solid residue is pumped to spray drier 10 through conduit 11 by pump 8 wherein they are contacted within a dry gas such as air, carbon dioxide or nitrogen, which enters through conduit 12a. The fruit is spray dried in chamber 12 under conditions so that the particle temperature is carefully controlled to prevent excessive oxidization or heat degradation of the taste-modifying principle as described above. A cold gas is introduced through conduit 15 into plenum 16 and through conduits 17 so as to reduce the temperature in the spray dryer 10. The dry particles then are directed through conduit 19 to cyclone 20 wherein the particles are separated from the gas. The particles then are directed through conduit 21, wherein they are contacted with air which is pressurized by means of primary blower 22. The pressurized air carries the particles into a separator 25 wherein the particles are separated on the basis of density.

The particles are introduced into the separator 25 tangentially along the walls thereof so that the particle mixture passes downwardly through separator 25 in a spiral path. At a vertically intermediate height of separator 25, a secondary air stream is introduced into plenum 26 which then is passed through permeable wall 27 which extends around the circumference of separator 25. When the downwardly moving particles contact the secondary air stream which is introduced radially, the lower density particles are accelerated towards the center of the separator 25 and are confined and segregated from the higher density particles by means of hopper 28. The higher density particles bypass hopper 28 and are collected in collecting means 29. The lower density particles are directed to a second separator 30 and introduced tangentially therein so that they are passed downwardly in a spiral path. A secondary gas stream is introduced into plenum 31 and through permeable wall 32 extending around the circumference of the separator 30. The low density particles are collected in hopper 31*a* and the higher density particles are collected in collector 32*a* in a manner described with reference to separator 25. The separators 25 and 30 are more fully described in a copending application filed concurrently herewith by Robert J. Harvey and entitled, "Method and Apparatus for Separating Particles on the Basis of Size of Density."

The gas obtained from cyclone 20 contains moisture and some particles. Accordingly, when air is not employed, prior to recycling the gas to spray drier 10 it is filtered in filter 35 and directed to condenser 36 wherein liquids are condensed therefrom and remove through conduit 37. The gas is then further dried in the presence of a desiccator in drier 37*a*. The dried gas is then directed to plenum 11 by means of primary blower 38. The gas is heated in heater 40 to a temperature of about 175 to 200° C. to accelerate liquid evaporation in the spray drier 10. Make-up dry gas is introduced from reservoir 41 into the primary blower 38. When air is used as the drying gas, the system is operated as an open cycle system with the incoming air entering the system at filter 35 being exhausted to the atmosphere directly from the cyclone separator 20.

The preferred process of this invention is based upon the discovery that degradation of the active principle in the fruit is initiated immediately after the ripe fruit is picked, and that degradation of the active principle in its natural environment is accelerated by increased temperature and by contact with air. Thus, it is preferred to process the ripe miracle fruit quickly, and at a relatively low temperature in order to obtain a high yield of the active principle. Preferably, the picked fruit is washed in water and then depitted at about 1 to 4° C. The fruit can be stored in a frozen state to await processing or can be processed immediately to obtain the active principle. When stored, temperatures of about −40° C. or less are employed to arrest degradation. Since it is difficult to remove the pit or seed from the frozen berry, it is preferred to depit the berry prior to frozen storage. The depitted berry, regardless of whether it has been stored previously or whether it is processed directly after having been picked, is comminuted to obtain particles having an average size less than about 150 microns, preferably less than about 50 microns. Comminution can be effected at normal room ambient conditions and generally is completed within a few seconds. Comminution can be effected by blending, grinding or milling. The preferred method is by use of a Fitz-mill.

During spray drying, the particles are contacted with a dry gas stream such as air, carbon dioxide or nitrogen at an elevated temperature. The dried particles contain from about 5 wt. percent water down to the amount of water comprising water of hydration in the protein molecule or about 0.5 wt. percent.

The powdered product then is further separated on the basis of density. The separation of the material containing the concentrated active principle from the other dry material is based upon the fact that the material rich in the active principle is more dense than the other material. Thus, the mixture of inerts and active material described above can be separated by any convenient density separation method including settling from a suspension of the mixture in liquid, the use of fluidizing bed technique, or through the use of cyclone type centrifuge.

The solvent extraction step to remove carbohydrates is conducted by admixing the comminuted ripe fruit with the solvent one or more times and then separating the remaining solid from liquid, as for example by filtration and then removing residual solvent by evaporation. The solvent extraction to remove carbohydrates can be conducted either prior to or subsequent to the spray-drying step. The solvent employed dissolves the carbohydrate without dissolving or degrading a substantial portion of the active principle. Representative suitable solvents include water, and ethanol-water mixtures or the like. When employing water or solvents containing water, prior to the spray-drying step, the solvent extraction step should be conducted relatively qiuckly, i.e. for less than about 10 or 15 minutes since water tends to accelerate degradation of the active principle by the enzymes in the fruit. It is preferred to condut the solvent extraction step prior to spray drying since residual solvent in the comminuted fruit can be removed therefrom in the spray-drying step.

In another aspect of the present invention, the concentrate containing the active principle can be treated further to improve its appearance for use in foods while not degrading the active principle. Thus, the concentrate can be treated to remove further any reddish color of the ripe fruit by introducing a bleaching agent into the comminuted pulp prior to spray drying or by additional solvent extraction using an alcohol-water mixture. A suitable bleaching agent is sodium sulfite. Furthermore, it has been found that miracle fruit contains certain fatty materials which upon oxidation may impart a slightly rancid taste to the stable product. Accordingly, the spray dried product can be treated either after the spray-drying step or the density separation step with a solvent extraction step using a solvent for fats which is subsequently separated from the end product using conventional filtering techniques. Suitable solvents include acetone or ether. The last trace of the solvent is removed from the concentrate containing the active principle by evaporation which is readily accomplished with such volatile solvents.

In one aspect, the present invention provides a stable composition containing a higher concentration of the taste-modifying principle than is obtained by the process disclosed in the above-identified copending application Ser. No. 28,981. It has been found that up to about 65 weight percent of the product obtained by our prior process comprise carbohydrates and other soluble components which can be removed from the composition by solvent extraction. The stable taste-modifying principle in the composition of this invention and that disclosed in prior applications are the same since the carbohydrates are inert with respect to the taste-modifying characteristics of these compositions. However, the concentrated composition of this invention provides a substantial advantage over that disclosed by our prior application since much smaller unit dosage forms can be prepared therefrom. As disclosed by our prior application Ser. No. 130,481, unit dosage forms contain from about 20 to 100 milligrams of the prior stable taste-modifying material. In contrast, the low carbohydrate compositions of the invention are useful in unit dosage forms in amounts from about 1 to 25 milligrams.

The composition of this invention comprises particulate solid rich in the taste modifying principle of *Synsepalum dulcificum* Daniell for suppressing sour taste and enhancing sweet and salt taste obtained from the ripe fruit of *Synsepalum dulcificum* Daniell which is substantially free of the components of the ripe fruit that degrade the taste-modifying principle and substantially free of the hygroscopic soluble carbohydrate of the ripe fruit. The taste-modifying composition contains less than about 25 weight percent carbohydrates, as compared to about 70 weight percent in the product obtained by the process of Ser. No. 28,981.

The stable taste-modifying composition substantially free of carbohydrates can be employed to form unit dosage forms that are effective for varying the time period the composition modifies the taste receptors of the tongue.

In designing a unit dosage form, there are a number of variables to be considered, the most important of which are:

(1) The level of activity of the taste modifying effect (level of sweetness and the qualitative taste characteristics of the flavor enhancing effect);
(2) The duration of the taste-modifying effect;
(3) The speed of reaction; that is, the time after chewing the unit dose form before it becomes fully effective;
(4) The economics of the separate unit dose form.

All of these above variables are affected by both the dose, or the amount, of the taste-modifying composition, as well as the particle-size distribution of the active principle.

The smaller the particle size, of the active principle, the more rapidly the full taste-modifying effect becomes effective. Therefore, this relationship is relatively straight-forward. Similarly with the economics, the lower the dose, the more favorable the economics, particularly for higher volume production.

The relationship of the level of sweetness and quality of the flavor-modifying characteristics, and the duration or the taste-modifying effect, as a function of the particle size distribution, are all much more involved. As one holds the particle size distribution constant, and increases the dose, one finds that there are two distinct patterns of response. From a unit dose less than 1 mg. to a dose up to about 15 to 20 mg., there is a rapid increase in the level of sweetness that one perceives from otherwise sour foods eaten subsequently to administering the separate unit dose form. Above about 20 mg., increasing the dose further, does not cause a further increase in the level of sweetness. In other words, the saturation point has been reached.

Similarly with the duration of the taste-modifying effect. As the dose is increased from less than 1 mg. to about 25 mg., one notes that the duration of the taste-modifying effect is extended from a few minutes to more than an hour. As the dose is increased much above a dose of 25 mg., there is not much further increase in the duration of the taste-modifying effect. On a cost effectiveness basis, there is no advantage in having a dose greater than 25 mg.

If one holds the dose constant, say at 10 to 15 mg., and varies the particle size of the active ingredient, one also notes changes in both the level of taste-modifying activity as well as the duration of the effect. However, the upper and lower limits of particle size are determined by other considerations. On the large particle size, one finds it difficult to formulate mixtures of dry powders when the particle size is larger than about 300μ. Similarly, when the particle size drops much below 50μ, certainly below 10μ, one finds it difficult to work effectively with such fine material. Therefore, the range of particle size of interest is 10 to 300μ. This particle size range for a fixed dose of about 12 mg., gives a duration of response from a few minutes to about one hour. Of course, if one wants a fast-acting response, one should include a significant fraction of the active material with a particle size of less than 50μ.

The unit dosage form can be of any physical form, most usually a powder or a tablet. Active principle of varying particle size is formed by any conventional comminuting process, for example, ball-milling, pestal and mortar or other dry brinding processes such as Fite milling. The active principle is comminuted and then screened to isolate various particle size ranges.

The following examples illustrate the present invention and are not intended to limit the same.

EXAMPLE I

Ripe miracle fruit berries are picked and washed in cold water.

The fruit then is depitted in a juicer comprising a perforated cylindrical housing with a rotating brush extending along the cylindrical length, the ends of which contact the inside cylinder wall. During rotation, the berries tumble and are pressed against the perforated housing causing the juice and pulp material to pass through the holes, leaving the pits in the cylinder. The juice and pulp are pumped to a mill to comminute the particles. The particles are screened to pass particles having an average size less than 150 microns (100 mesh) while the particles larger than 150 microns are recycled to the grinding step. Cooling is desirable during grinding to prevent thermal degradation.

The particles are then washed twice in a cold solvent containing 75% ethanol and 25% distilled water. The solid material is separated from the liquid phase.

The slurry (solid phase) is then pumped to a spray drier wherein the particles contact an incoming stream of dry air, at a temperature such that the particle temperature does not exceed more than about 80° C., usually from about 60° C. to about 70° C. The average contact time of the particles and gas in the spray drier particles is less than about a second. The moisture content of the final spray dried powder is about 3 to 5 wt. percent.

The fine dried powder obtained from the spray drier is introduced into a pneumatic cyclone-type separator, whereby the material rich in the active principle is concentrated near the inside wall and the other material is concentrated closer to the center of the cyclone. The mixture to be separated is introduced into the top of the cyclone and caused to move in a circular path down the inside wall. The product is separated from the lower density material by a baffle located at the interface between the high and low density material. The lower density material is recycled until substantially all the active principle is separated. The concentrated product can be recycled if necessary, to achieve any degree of separation from the lower density material.

The powder obtained by this process has a moisture content of 1–3 wt. percent; it is room temperature stable even when stored in the open atmosphere for at least a year or more; and it can be used to produce unit dose forms including tablets or aerosol sprays. The dry powder obtained contains about 40% protein, about 25% carbohydrates, about 3% moisture, and the remainder fat and inerts.

EXAMPLE II

The procedure of Example I was followed with the additional step of washing the comminuted particles with acetone to solubilize selectively the fats remaining in the spray-dried powder.

The slurry then is evaporated in air at an ambient temperature to remove the residual acetone and to reduce the moisture content of the powder from about 3 wt. percent to about 1 wt. percent or less. It is not necessary to employ a controlled atmosphere in the acetone-removal step. After the acetone is removed, the powdered product is directed to the powder separation steps as described in Example I.

EXAMPLE III

The procedure of Examples I and II was followed with an additional step of adding sufficient sodium sulfite during the blending step so that the amount of sodium sulfite added represents 1% of the dry weight of the final product. The sodium sulfite was added to bleach the normally red or pink pulp and skin so that the final powdered product obtained is white. The sodium sulfite also functions as an antiseptic agent for micro-organisms.

EXAMPLE IV

This example illustrates a typical active principle formulation, a method for preparing chewable tablets therefrom and the results of tests on subjects after having chewed the tablets containing the powdered product produced according to Example I, above.

The formulation used to make the tablets is set forth in Table I.

TABLE I

| Identification: | Amount, mg. |
|---|---|
| Taste-modifying powder | 20 |
| Lactose, direct tableting grade | 279.3 |
| Sorbitol, direct tableting grade | 80.0 |
| Flavoring | 7.0 |
| Coloring | 0.7 |
| Magnesium Stearate | 13.0 |
| Total weight of tablet | 400 |

The following procedure was carried out at a temperature of 68–75° F. with relative humidity or less than 50% to prepare the tablets. The ingredients set forth in Table I were mixed and blended, including the active principle obtained by the process of Example I at a concentration of 20 milligrams active principle per tablet. The particle size ranged from less than 50µ to 150µ.

The tablets were made by pressing the formulation in a Stokes Rotary Tablet Press (B2) using a standard 12/32 inch concave punch. The tablets had a hardness (Monsanto) of 3.0–3.5 kg. and weighed 400 milligrams.

The tablets were tested for their taste-modifying effects by a procedure that determines the apparent sweetness effected by a standard citric acid solution after chewing the tablet containing the active principle, and comparing this sweetness to sugar solutions of known concentration. Each subject rinsed his mouth for one minute with distilled water. The tablet containing the active principle then was thoroughly chewed for one minute. Then the subject rinsed his mouth with distilled water for thirty seconds and waited two minutes. The subject then tasted a standard citric acid solution (.03 M). After tasting the citric acid solution, the subject rinsed with distilled water for thirty seconds. After experiencing the sweetness of the citric acid solution, the subject was then required to compare the sweetness experienced with standard sugar solutions of known concentrations to determine the relative sweetness of the citric acid solution. The results for each formulation as a function of time was as shown in Table II.

The period of effectiveness is affected by the extent of salivation; the more one salivates the faster the effect wears off. The above data was collected by stimulating at frequent intervals. It is not likely that the period of effectiveness could be reduced by more than 10% or 15% by increased salivation caused by the intense taste testing. However, if one administers the active principle, but then does not eat or otherwise stimulate the taste receptors or does not otherwise cause increased salivation, then the period of effectiveness stated in Table II could be extended as much as 50%.

TABLE II.—ORGANOLEPTIC EVALUATION

Formulation: Table I

| | |
|---|---|
| Tast-modifying effect became effective | Instantly (less than 10 seconds). |
| Retained full level of sweetness | 45 minutes. |
| Time after which it became objectionable | 75 minutes. |
| Time before the effect was completely gone | 90 minutes. |

What is claimed is:

1. In a process for obtaining a composition for suppressing sour taste and enhancing sweet and salt taste, which retains its taste-modifying characteristics at normal room temperature for long periods, said composition comprising particulate solid material rich in the taste-modifying principle of *Synsepalum dulcificum* Daniell for suppressing sour taste and enhancing sweet and salt taste obtained from the ripe fruit of *Synsepalum dulcificum* Daniell, which solid is substantially free of the active components of the ripe fruit that otherwise degrade the taste-modifying principle; which process comprises comminuting the ripe fruit to rupture the cellular structure thereof, drying a portion of the comminuted ripe fruit including the taste-modifying principle and dissociating the enzymatic components of the ripe fruit that degrade the taste-modifying principle from the material rich in the taste-modifying principle of the comminuted ripe fruit, that improvement wherein:

the portion including the taste-modifying principle is heated to a temperature up to about 165° C. during said drying without oxidizing a substantial portion of the taste-modifying principle.

2. The process of claim 1 wherein pigments in the ripe fruit are removed from the portion including the taste-modifying principle by solvent extraction.

3. The process of claim 1 wherein fats in the ripe fruit are removed from the portion including the taste-modifying principle by solvent extraction.

4. The process of claim 3 wherein pigments in the ripe fruit are removed from the portion including the taste-modifying principle by solvent extraction.

5. The process of claim 1 wherein the soluble carbohydrates are removed from the portion including the taste-modifying principle by solvent extraction.

6. The process of claim 5 wherein pigments in the ripe fruit are removed from the portion including the taste-modifying principle by solvent extraction.

7. The process of claim 5 wherein fats in the ripe fruit are removed from the portion including the taste-modifying principle by solvent extraction.

8. The process of claim 7 wherein pigments in the ripe fruit are removed from the comminuted ripe fruit by solvent extraction.

9. The process of claim 1 wherein the portion including the taste-modifying principle is spray dried by heating in a gas.

10. The process of claim 9 wherein the portion including the taste-modifying principle is spray dried in heated air to raise the temperature of the portion including the taste-modifying principle to about 60° C. to 80° C.

11. The process of claim 10 wherein pigments in the ripe fruit are removed from the portion including the taste-modifying principle by solvent extraction.

12. The process of claim 10 wherein fats in the ripe fruit are removed from the portion including the taste-modifying principle by solvent extraction.

13. The process of claim 12 wherein pigments in the ripe fruit are removed from the comminuted ripe fruit by solvent extraction.

14. The process of claim 10 wherein the soluble carbohydrates are removed from the portion including the taste-modifying principle by solvent extraction.

15. The process of claim 14 wherein pigments in the ripe fruit are removed from the portion including the taste-modifying principle by solvent extraction.

16. The process of claim 14 wherein fats in the ripe fruit are removed from the portion including the taste-modifying principle by solvent extraction.

17. The process of claim 16 wherein pigments in the ripe fruit are removed from the comminuted ripe fruit by solvent extraction.

18. The process of claim 9 wherein the comminuted ripe fruit is dried prior to said dissociating.

19. The process of claim 18 wherein the comminuted ripe fruit is spray dried in heated air to raise the temperature of the comminuted ripe fruit to about 60° C. to 80° C.

20. The process of claim 19 wherein fats in the ripe fruit are removed from the comminuted ripe fruit by solvent extraction.

21. The process of claim 19 wherein pigments in the ripe fruit are removed from the comminuted ripe fruit by solvent extraction.

22. The process of claim 19 wherein the soluble carbohydrates are removed from the comminuted ripe fruit by solvent extraction.

23. The process of claim 22 wherein pigments in the ripe fruit are removed from the comminuted ripe fruit by solvent extraction.

24. The process of claim 22 wherein fats in the ripe fruit are removed from the comminuted ripe fruit by solvent extraction.

25. The process of claim 24 wherein pigments in the ripe fruit are removed from the comminuted ripe fruit by solvent extraction.

References Cited
UNITED STATES PATENTS 3,676,149   7/1972   Fennell et al. _____ 99—140 R MORRIS O. WOLK, Primary Examiner S. MARANTZ, Assistant Examiner U.S. Cl. X.R.

424—195; 426—148, 221, 431, 481